(12) United States Patent
Rudolph et al.

(10) Patent No.: US 6,548,003 B1
(45) Date of Patent: Apr. 15, 2003

(54) METHOD FOR THE MANUFACTURE OF A HOUSING FOR AN ELECTRICAL CONNECTION SYSTEM BETWEEN PARTS THAT CAN BE ROTATED WITH RESPECT TO EACH OTHER

(75) Inventors: Gerd Rudolph, Aspisheim (DE); Klaus Stute, Mainz (DE)

(73) Assignee: Delphi Technologies, Inc., Troy, MI (US)

( * ) Notice: Subject to any disclaimer, the term of this patent is extended or adjusted under 35 U.S.C. 154(b) by 240 days.

(21) Appl. No.: 09/679,173

(22) Filed: Oct. 4, 2000

(30) Foreign Application Priority Data

Oct. 9, 1999 (DE) .......................... 199 48 724

(51) Int. Cl.[7] .............................. B29C 45/14
(52) U.S. Cl. ............. 264/242; 264/255; 264/257; 264/263; 264/266; 264/271.1; 264/328.1; 439/15; 439/16; 29/434
(58) Field of Search ........................... 264/242, 243, 264/257, 255, 259, 263, 266, 271.1, 279.1, 328.1, 318.1, 328.8; 439/15, 16; 29/434

(56) References Cited

U.S. PATENT DOCUMENTS

| | | | | |
|---|---|---|---|---|
| 5,100,331 A | * | 3/1992 | Banfelder ................... 439/15 |
| 5,586,381 A | * | 12/1996 | Schauer et al. ............... 29/434 |
| 5,643,002 A | * | 7/1997 | Wolf et al. .................. 439/164 |
| 5,975,453 A | * | 11/1999 | Sakata et al. ............... 242/388 |
| 6,019,621 A | * | 2/2000 | Sugata et al. ............... 439/194 |
| 6,065,707 A | * | 5/2000 | Sakata et al. ............... 242/388 |
| 6,325,657 B1 | * | 12/2001 | Schroer ...................... 439/391 |

* cited by examiner

*Primary Examiner*—Stefan Staicovici
(74) *Attorney, Agent, or Firm*—Thomas N. Twomey

(57) ABSTRACT

A method for the manufacture of a housing (1) for an electrical connection system between parts that can be rotated with respect to each other, in particular between a steering wheel and a steering column, comprising a stationary housing part (3) and a housing part (4) which can be rotated relative with respect thereto, each of housing parts supporting a connector unit (10) and enclosing a spirally wound flexible electrical conductor (6) connected on its ends with connector units (10). The internal axial boundary surfaces (8) of the housing parts (3, 4) are provided with an insulating material (9). The insulating material (9) is a plastic material exhibiting sound-absorbing properties and is extrusion-coated on the internal axial boundary surfaces (8) of the plastic injection-molded housing parts (3, 4).

6 Claims, 2 Drawing Sheets

METHOD FOR THE MANUFACTURE OF A HOUSING FOR AN ELECTRICAL CONNECTION SYSTEM BETWEEN PARTS THAT CAN BE ROTATED WITH RESPECT TO EACH OTHER

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The invention herein relates to a method for the manufacture of a housing for an electrical connection system between parts that can be rotated with respect to each other, in particular, between steering wheel and steering column, comprising a stationary housing part and a housing part which can be rotated relative thereto, each of said housing parts supporting a connecting unit and enclosing a spirally wound flexible electrical conductor connected on its ends with connecting units, whereby the internal axial boundary surfaces of the housing parts are provided with an insulating material.

Power line connectors of this type are used in particular to establish an electrical connection between a power source and a motor vehicle's protective gas-type impact device or air bag located in the steering wheel well. In this case a conductor ribbon located between the stationary housing part and the housing part that can be rotated with respect to the latter housing part has a length such that it can follow or accommodate the approximately three revolutions used to turn the steering wheel, whereby, while the steering wheel is turned in one direction, the elastic conductor ribbon expands toward the outside from a central position until it abuts against the stationary housing and contracts toward the inside when the steering wheel is turned in the other direction until it abuts against the rotatable housing part. In so doing, however, the conductor ribbon makes a scraping noise when the steering wheel is turned during normal operation and a loud rattling noise when rough road is encountered in curves or while driving on uneven terrain, these noises being caused predominantly by the convolutions of the conductor ribbon striking against each other.

German patent document EP-B-0 417 350 discloses a power line connector used to bridge line interruptions between parts that can be rotated relative to each other, in particular, between a steering wheel and its steering column. The power line connector consists of a housing with a cover provided with a conductor output representing the stator that can be mounted to the steering column and of a rotor that is connected with the steering wheel and rotatably supported in the housing and also provided with a conductor output. The housing and the cover represent the boundaries of a circular space surrounding the rotor, the space being used to accommodate a conductor ribbon whose plurality of convolutions wind around the rotor and terminate in the conductor outputs. In order to reduce noise developed by the conductor ribbon, the sides of the bottom of the housing and the cover facing the insulated conductor ribbon are provided with a coating of an insulating textile material. In such an arrangement it has been found to be a problem to fasten the insulating textile material to the appropriate surfaces of the housing and the cover which is typically of plastic material. Adhesives that partially dissolve the plastic material of the housing and the cover, thereby creating a good bond with the insulating material, frequently impair the textile structures of the insulating material, thereby having a negative effect on the noise-absorbing properties of the latter. However, the use of other adhesives for fixing the insulating material in place at the respective housing and cover surfaces has be unsuccessful in ensuring a long-lasting bond. Furthermore, gluing the insulating material to the respective housing and cover surfaces is labor-intensive and hence costly in high volume production.

Therefore, the problem to be solved by the invention herein is to provide a method by means of which the noise developed by the flexible conductor employed with a steering wheel is reduced effectively, permanently and in a cost-effective manner.

BRIEF SUMMARY OF THE INVENTION

In accordance with the invention herein the above-described problem has been solved in that the insulating material extrusion-coated on the internal axial boundary surfaces of the injection-molded plastic housing parts is a plastic material with sound-damping properties.

By extrusion-coating the plastic material, which may, for example, be a thermoplastic elastomer, good sound absorption of the elastic conductor is achieved. The extrusion-coating operation requires relatively little work, which is why the housing parts can be manufactured together with the sound insulation in a cost-effective manner.

Furthermore, the plastic material having the sound-damping properties forms a homogeneous bond with the plastic housing parts which is why reliable, long-lasting sound-absorption is guaranteed.

In accordance with an advantageous embodiment of the present invention, the plastic material is applied in a pattern of parallel or cruciform ribs. Therefore, the conductor rests only partially on the plastic ribs exhibiting the sound-damping properties; it is subject to relatively little wear because the areas where the conductor rests on the ribs offer little frictional resistance compared with a large-area contact.

Preferably, the ribs consist of plastic material exhibiting sound-damping and sliding properties. For example, it is satisfactory to use a plastic material processed with polytetrafluoroethylene which will withstand stress caused by the conductor for a relatively long time. The use of a plastic material which offers relatively good sliding properties also affects the useful life of the insulation of the conductor in a positive manner.

The cost-effective manufacture of the housing parts in relatively large numbers is achieved preferably by manufacturing the housing parts along with the corresponding insulating material by means of a two-component injection-molding process. This manufacturing process produces finished parts that can be used as intended without manual finishing work.

An alternative embodiment of the present invention uses fleece as insulating material and the fleece material is partially extrusion-coated on the internal axial boundary surfaces of the housing parts at the time the housing parts are manufactured, whereby the areas of the fleece facing the conductor are not coated with plastic material.

During the manufacture of the housing parts by means of this method the plastic material melt which is used for injection-molding the housing parts partially penetrates the peripheral areas of the fleece material, embedding itself in the fibers of the latter. As a result, a homogeneous bond between the sound-damping fleece material and the appropriate surfaces of the housing parts is created. This technique provides a relatively long-lasting sound-damping effect. Furthermore, sound-damping is achieved in a relatively cost-effective manner without cost-intensive manual labor.

In order to avoid additional tooling costs, the fleece is advantageously placed in an appropriate negative mold before the housing parts are formed by injection-molding. The fleece can be inserted, for example, with the use of generally known application devices.

Preferably, the fleece material consists of textile material or synthetic fibers. These fibers are embedded relatively well in the plastic material of the housing parts, which is why a secure bond between the housing part and the associate fleece material is ensured. Furthermore, the textile material, as well as the synthetic fibers, withstand the stress exerted by the conductor.

DETAILED DESCRIPTION OF THE INVENTION

Figure 1:
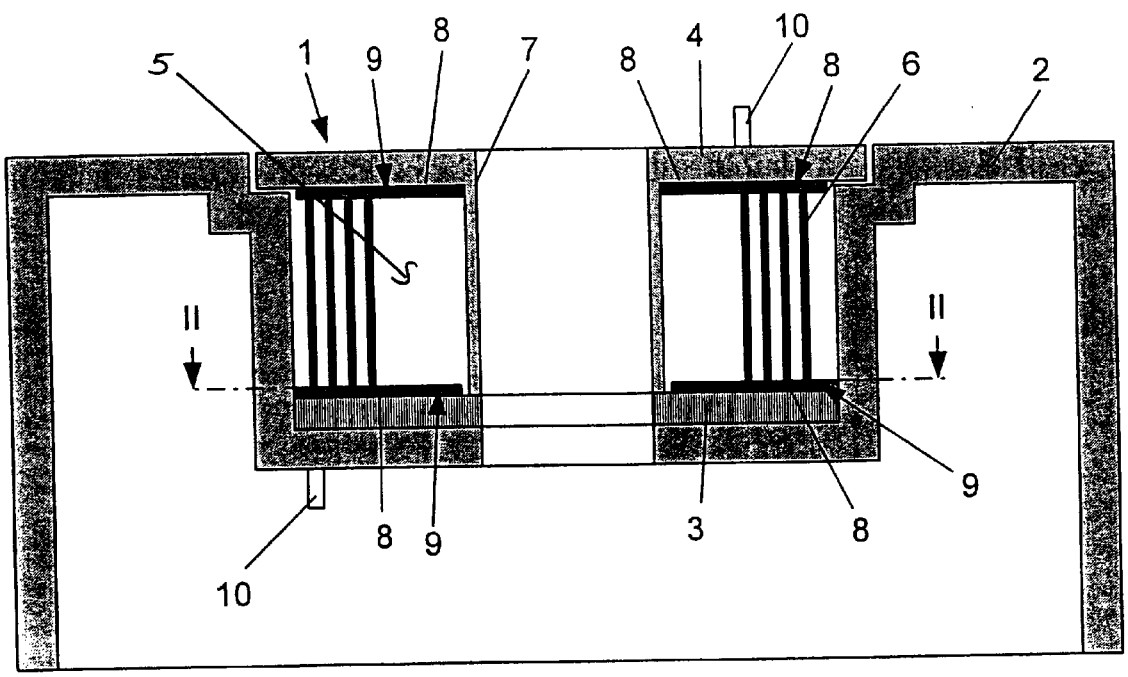
FIG. 1 is a longitudinal sections of a housing for an electrical connection arrangement as manufactured in accordance with the method of the invention herein.
Figure 2:
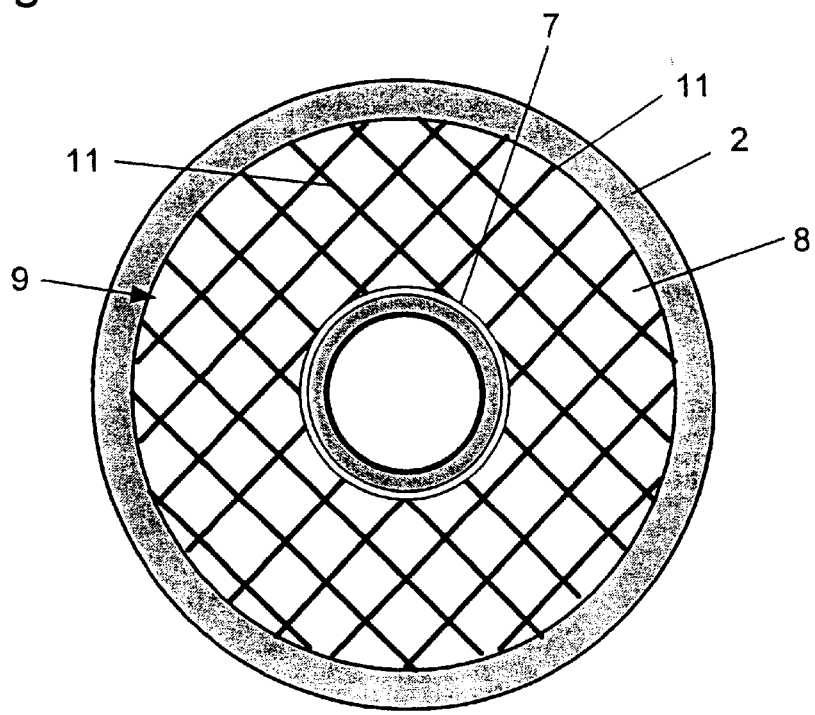
FIG. 2 is a sectional view of the illustration of FIG. 1 along line 11-11.
Figure 3:
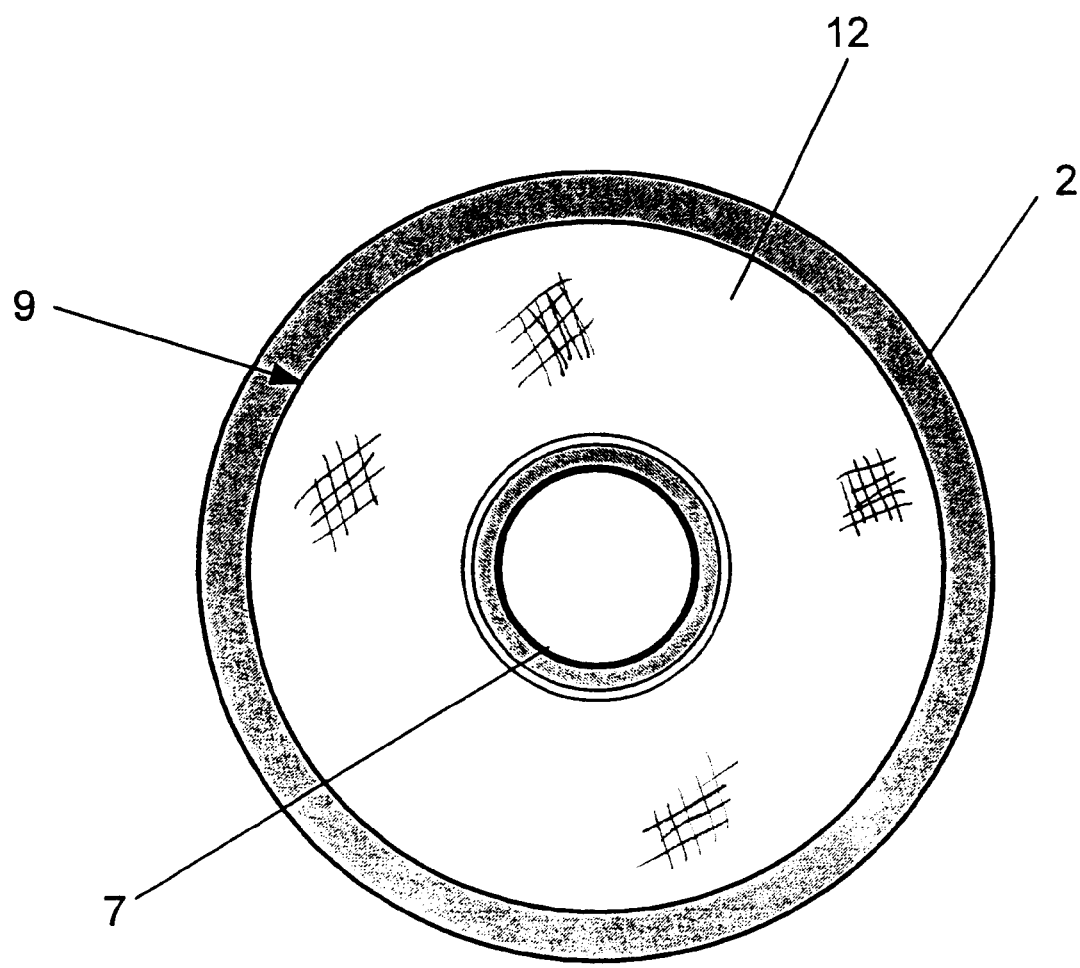
FIG. 3 is an illustration of an alternative embodiment in accordance with FIG. 2.

Referring to FIGS. 1 through 3, the electrical connection system comprises a housing indicated generally at 1 consisting of a housing part 3 fixed in a steering column switch housing 2 and of a rotatable housing part 4 connected with a not illustrated steering wheel such that it can be rotated relative to said steering wheel. Steering column switch housing 2, together with housing part 3 affixed to it, are located on a jacket tube of a steering column (not shown). Both housing parts 3, 4 and steering column switch housing 2 form a hollow circular or annular space 5 for the accommodation of a flexible electrical conductor 6 wound in the form of a spiral in several convolutions about a hub 7 of housing part 4. Internal axial boundary surfaces 8 of housing parts 3, 4 are provided with an insulating material indicated generally at 9 which acts as a support for conductor 6. Insulating material 9 is a plastic material exhibiting at least sound-damping properties and is extrusion-coated on respective boundary surfaces 8. Furthermore, the ends of conductor 6 are connected with a connecting unit or terminal 10 associated with stationary housing part 3 and rotatable housing part 4.

Referring to FIG. 2, housing parts 3, 4 consist of plastic material and are manufactured by injection-molding. Internal axial boundary surfaces 8 of housing parts 3, 4 are provided with insulating material 9 configured as cruciform ribs 11 consisting of plastic material exhibiting sound-damping and sliding properties. Housing parts 3 and 4 are injection-molded together with their associated ribs 11 by means of a two-component injection-molding process, whereby during a first injection cycle the respective housing parts 3 and 4 are formed and during a subsequent injection cycle the ribs 1I1 are formed. As a result, a homogeneous bond is created between housing parts 3 and 4 and ribs 11.

In the illustration of FIG. 3 insulating material 9 is a fleece material 12 produced from textile material or synthetic fibers. Before injection-molding respective housing parts 2 and 4, fleece material 12 is placed into an appropriate negative mold at the site representing internal axial boundary surface 8 of housing parts 3 and 4, respectively. While injection-molding housing parts 3 and 4, fleece material 12 is partially extrusion-coated, whereby the surface of fleece material 12 facing-conductor 6 is not coated with plastic material. By extrusion-coating fleece material 12 it is affixed in a durable manner to its associate boundary surface 8, without impairing the sound-damping properties of fleece material 12 as a result of this. Although the invention has hereinabove been described with respect to the illustrated embodiments, it will be understood that the invention is capable of modification and variation and is limited only by the following claims.

What is claimed is:

1. A method for the manufacture of a housing for an electrical connection system between parts that can be rotated relative to each other, comprising: a stationary housing part and a housing part which can be rotated with respect thereto, each of said housing parts supporting an electrical connector terminal and said housing parts are disposed enclosing a spirally wound flexible electrical conductor connected on its ends with connector terminals, whereby the housing parts have internal boundary surfaces provided with an insulating material, with the insulating material in the form of a plastic material exhibiting sound-damping properties extrusion-coated on the internal axial boundary surfaces of the housing parts manufactured by plastic injection-molding process, whereby a fleece material is used as the insulating material, characterized in that, during the injection molding process of the housing parts, the fleece material is partially extrusion-coated on the internal axial boundary surfaces of the housing parts, whereby the surfaces of the fleece material facing the conductor are not coated with plastic material.

2. Method in accordance with claim 1, characterized in that the plastic material is applied in ribs having parallel or cruciform pattern.

3. Method in accordance with claim 2, characterized in that the ribs are produced of a plastic material exhibiting sound-damping and sliding properties.

4. Method in accordance with claim 1, characterized in that the housing parts, together with the appropriate insulating material, are manufactured by means of a two-component injection-molding process.

5. Method in accordance with claim 1, characterized in that, before the housing parts are injection-molded, the fleece material is placed in a negative mold.

6. Method in accordance with claim 5, characterized in that the fleece material is produced from textile material or synthetic fibers.

* * * * *